US011403762B2

(12) United States Patent
Liao (10) Patent No.: US 11,403,762 B2
(45) Date of Patent: Aug. 2, 2022

(54) IMAGE PROCESSING METHOD AND RELATED CAMERA DEVICE

(71) Applicant: VIVOTEK INC., New Taipei (TW)

(72) Inventor: Yen-Chun Liao, New Taipei (TW)

(73) Assignee: VIVOTEK INC., New Taipei (TW)

( * ) Notice: Subject to any disclaimer, the term of this patent is extended or adjusted under 35 U.S.C. 154(b) by 320 days.

(21) Appl. No.: 16/005,721

(22) Filed: Jun. 12, 2018

(65) Prior Publication Data

US 2018/0365836 A1  Dec. 20, 2018

(30) Foreign Application Priority Data

Jun. 14, 2017 (TW) ................................. 106119781

(51) Int. Cl.
*G06T 7/11* (2017.01)
*G06T 7/00* (2017.01)
*G06T 7/143* (2017.01)
*G06T 9/00* (2006.01)
*G06V 10/50* (2022.01)
*G06V 10/22* (2022.01)
*G06V 10/75* (2022.01)
*G06V 20/40* (2022.01)
*H04N 19/115* (2014.01)
*H04N 19/136* (2014.01)

(Continued)

(52) U.S. Cl.
CPC .............. *G06T 7/11* (2017.01); *G06T 7/0002* (2013.01); *G06T 7/143* (2017.01); *G06T 9/00* (2013.01); *G06V 10/235* (2022.01); *G06V 10/50* (2022.01); *G06V 10/758* (2022.01);

*G06V 20/40* (2022.01); *G06T 2207/10016* (2013.01); *G06T 2207/20021* (2013.01)

(58) Field of Classification Search
CPC ... G06T 7/11; G06T 9/00; G06T 7/143; G06T 7/0002; G06T 2207/20021; G06T 2207/10016; G06K 9/4642; G06K 9/00711; G06K 9/2081; G06K 9/6212; H04N 19/174; H04N 19/115; H04N 19/167; H04N 19/136
See application file for complete search history.

(56) References Cited

U.S. PATENT DOCUMENTS 8,204,321 B2 * 6/2012 Rossato ............... H04N 19/176
382/238
2006/0267993 A1 * 11/2006 Hunkins ................. G06F 3/14
345/629

(Continued)

FOREIGN PATENT DOCUMENTS

| TW | 200427332 A | 12/2004 |
|----|-------------|---------|
| TW | 201141234 A1 | 11/2011 |
| TW | 201234862 A1 | 8/2012 |

*Primary Examiner* — John W Lee
(74) *Attorney, Agent, or Firm* — Winston Hsu (57) ABSTRACT

An image processing method is applied to a camera device and a camera system. The image processing method includes dividing each image frame of a video film into a plurality of unit regions, computing a plurality of data quantity respectively corresponding to the plurality of unit regions, compiling statistics of a total data quantity of each unit region within a plurality of image frames of the video film, and distinguishing the each unit region from the other unit regions in accordance with the total data quantity.

10 Claims, 6 Drawing Sheets

(51) Int. Cl.
*H04N 19/167* (2014.01)
*H04N 19/174* (2014.01)

(56) References Cited

U.S. PATENT DOCUMENTS

| | | | |
|---|---|---|---|
| 2010/0080483 A1* | 4/2010 | Almbladh | G06T 1/20 |
| | | | 375/240.01 |
| 2011/0150076 A1* | 6/2011 | Wang | H04N 19/172 |
| | | | 375/240.03 |
| 2015/0350666 A1* | 12/2015 | Kovacevic | H04N 19/85 |
| | | | 382/173 |
| 2016/0149787 A1* | 5/2016 | Liao | H04L 43/16 |
| | | | 709/224 |

* cited by examiner

IMAGE PROCESSING METHOD AND RELATED CAMERA DEVICE

BACKGROUND OF THE INVENTION

1. Field of the Invention

The present invention relates to an image processing method and a related camera device and a related camera device, and more particularly, to an image processing method capable of applying specific compression rates to distinct unit regions within an image frame for optimizing utilization of a transmission bandwidth and a related camera device and a related camera device.

2. Description of the Prior Art

A conventional monitoring apparatus utilizes visual computing appliance to analyze bits of any region inside an image frame to define the foreground and the background of the image frame. For example, the region about a pavement having low bits is defined as the background, and the region about a walking person having high bits is defined as the foreground. The foreground is a region of interest compressed via a low compression rate, which means the compressed foreground region is clear and has large data quantity. The background is the region of not interest and is compressed via a high compression rate, which means the compressed background region is blurred due to small data quantity. The conventional monitoring apparatus is used to keep resolution of the region of interest and economize transmission bandwidth of the image frame. When leaves of the tree is swaying in the wind, the bits of the region about the leaves is increased, so that the conventional visual computing appliance may define the region about the trees as the foreground and compress the said region via the low compression rate; however, a user having the monitoring apparatus is not meant to focus on the trees. The conventional monitoring apparatus is unsuitable for various sceneries and cannot decrease a demand for the transmission bandwidth because the image frame is unable to divide into the regions of interest and not interest precisely.

The conventional visual computing appliance wastes unnecessary computation on the region of not interest (such as the region about the swaying leaves of the trees), and has drawbacks of consuming the transmission bandwidth, storage capacity and computing time. In addition, as the foreground and the background of the image frame are selected by the user, the user has to look at the original and unprocessed image frame in manual selection. Without auxiliary information about the foreground (the region of interest) and the background (the region of not interest), the user cannot quickly and precisely mark the regions of interest and not interest. Design of an image processing method capable of automatically identifying the regions of interest and not interest for applying different compression rates and economizing the transmission bandwidth is an important issue in the related monitoring industry.

SUMMARY OF THE INVENTION

The present invention provides an image processing method capable of applying specific compression rates to distinct unit regions within an image frame for optimizing utilization of transmission bandwidth and a related camera device and a related camera device for solving above drawbacks.

According to the claimed invention, an image processing method includes dividing each image frame of a video film into a plurality of unit regions, computing a plurality of data quantity respectively corresponding to the plurality of unit regions, compiling statistics of a total data quantity of each unit region within a plurality of image frames of the video film, and distinguishing the each unit region from other unit regions in accordance with the total data quantity.

According to the claimed invention, a camera device includes an image generator and an operational processor. The image generator is configured to capture a video film containing a plurality of image frames. The operational processor is electrically connected to the image generator and configured to analyze the video film, to divide each image frame of the video film into a plurality of unit regions, to compute a plurality of data quantity respectively corresponding to the plurality of unit regions, to compile statistics of a total data quantity of each unit region within a plurality of image frames of the video film, and to distinguish the each unit region from other unit regions in accordance with the total data quantity.

According to the claimed invention, a camera system includes at least one camera device and a central host. The camera device is configured to capture a video film containing a plurality of image frames. The central host is connected to the at least one camera device in a remote manner, and configured to receive the video film containing the plurality of image frames, to divide each image frame of the video film into a plurality of unit regions, to compute a plurality of data quantity respectively corresponding to the plurality of unit regions, to compile statistics of a total data quantity of each unit region within a plurality of image frames of the video film, and to distinguish the each unit region from other unit regions in accordance with the total data quantity.

The image processing method of the present invention can divide each image frame into the plurality of unit regions automatically or manually via an operating interface, and the data quantity of the unit region located at the same place inside the plurality of image frames are added up. When the total data quantity of each unit region is greater than the threshold, the storage capacity and the transmission bandwidth are occupied by the large total data quantity, so that the said unit region can be processed via the high compression rate. When the total data quantity of the unit region is lower than the threshold, the storage capacity and the transmission bandwidth may leave unused due to small total data quantity, and the said unit region can be processed via the low compression rate. That is, the present invention utilizes the bits of each unit region (or any parameters capable of indicating the data quantity) to determine regions applied by different compression rates within the image frame. The image processing method can automatically identify content of the image frame to decide the compression rates about different unit regions, so as to economize the storage capacity and the transmission bandwidth of the camera device or the camera system. Besides, the present invention can show the image frame (whereon some of the unit regions are marked according to the total data quantity) on the displaying screen, and an amount of the bits can be distinguished by lines with different widths or colors, therefore the user can select the region of not interest from some unit regions (the unit region is marked and has the total data quantity greater than the threshold) to process the related image information via the high compression rate. The present invention can keep the region of interest in the high quality, and can provide preferred utilization of the storage capacity and the transmission bandwidth.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
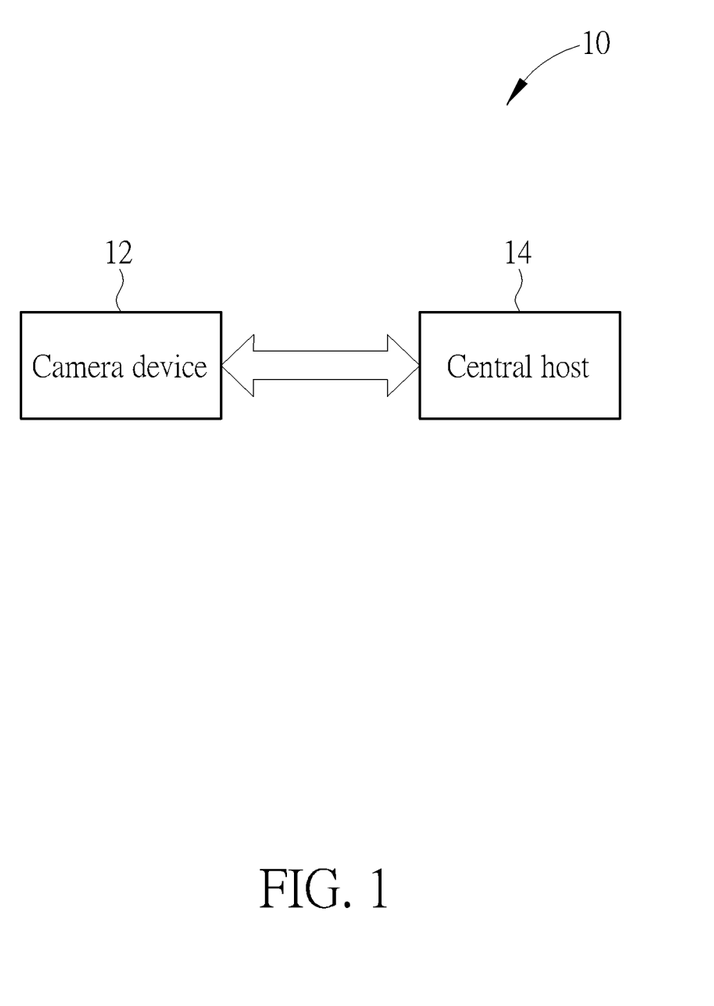
FIG. 1 is a functional block diagram of a camera system according to an embodiment of the present invention.
Figure 2:
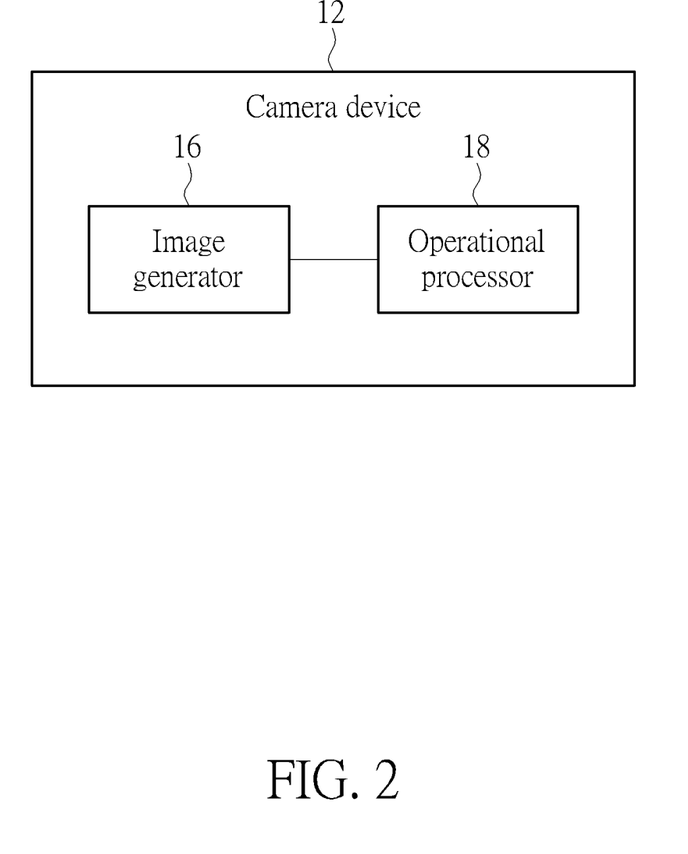
FIG. 2 is a functional block diagram of a camera device according to the embodiment of the present invention.
Figure 3:
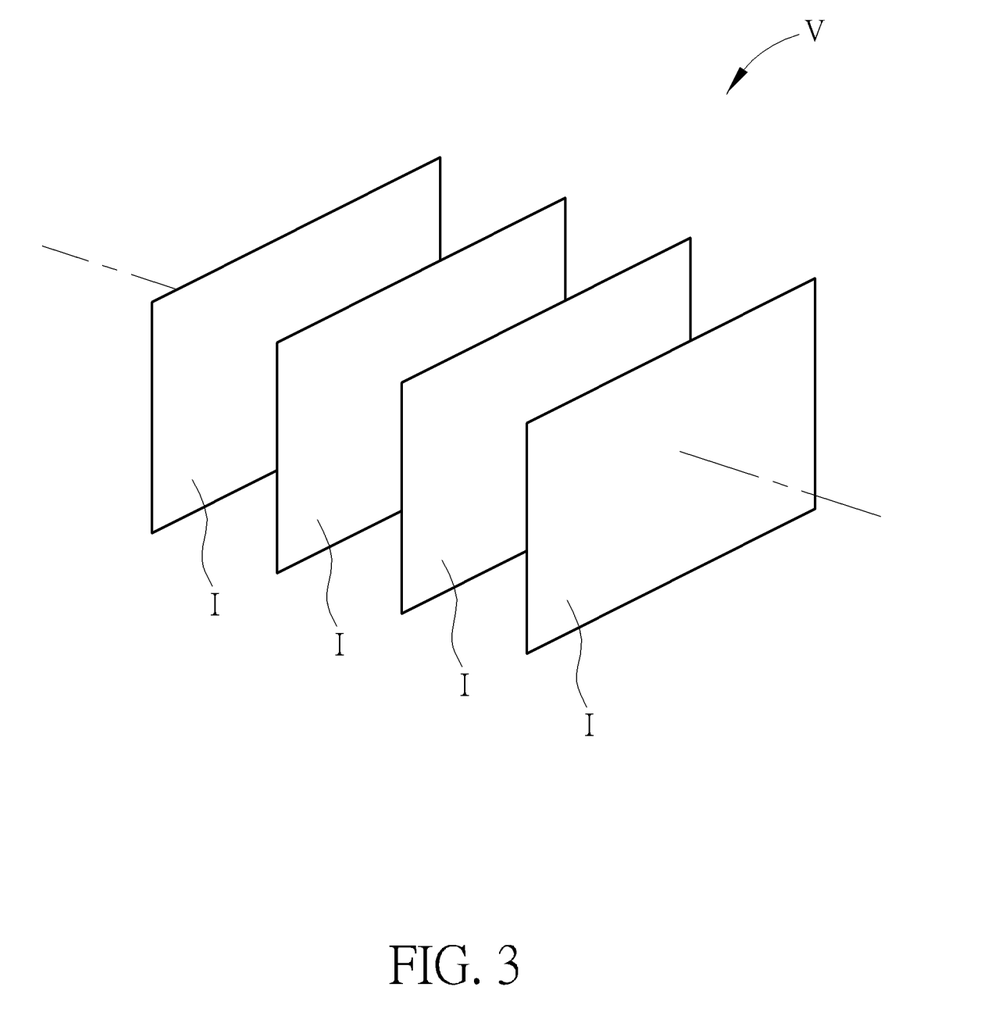
FIG. 3 is a diagram of a video film V containing a plurality of image frames according to the embodiment of the present invention.

Please refer to FIG. 1 to FIG. 3. FIG. 1 is a functional block diagram of a camera system 10 according to an embodiment of the present invention. FIG. 2 is a functional block diagram of a camera device 12 according to the embodiment of the present invention. FIG. 3 is a diagram of a video film V containing a plurality of image frames I according to the embodiment of the present invention. The camera system 10 can include the camera device 12 and a central host 14. The camera device 12 is used to capture the video film V. The central host 14 is used to receive the video film V captured by the camera device 12 in a remote-connection manner for analyzing, stitching or displaying functions. The camera system 10 or the camera device 12 can compress image information about the video film V for economizing transmission bandwidth on the premise that quality of the compressed video conforms to a user's demand.

As shown in FIG. 1 and FIG. 3, when the camera device 12 acquires the video film V, the central host 14 can directly receive the video film V in a wire connection or in a wireless connection, and an image processing method of the present invention is executed to analyze bits of any unit region within the video film V (or any parameter capable of indicating its data quantity), and then transmit an analyzing result to the camera device 12. The camera device 12 can compress and output the following-captured video film V according to parameters responded by the analyzing result for economizing transmission bandwidth and storage capacity and further effectively decreasing operation loading of the camera device 12. As shown in FIG. 2 and FIG. 3, the camera device 12 can include an image generator 16 and an operational processor 18 electrically connected with each other. The image generator 16 is used to capture the video film V. The operational processor 18 is used to execute the image processing method of the present invention before outputting the video film V. Each image frame of the video film V can be divided into a plurality of unit regions respectively having a distinct compression rate according to the bits or any parameters about the data quantity. The unit region not concerned by the user and having the larger total data quantity is processed via the high compression rate to effectively decrease the data quantity, and further to achieve aims of real-time compression and economy of the transmission bandwidth.

Figure 4:
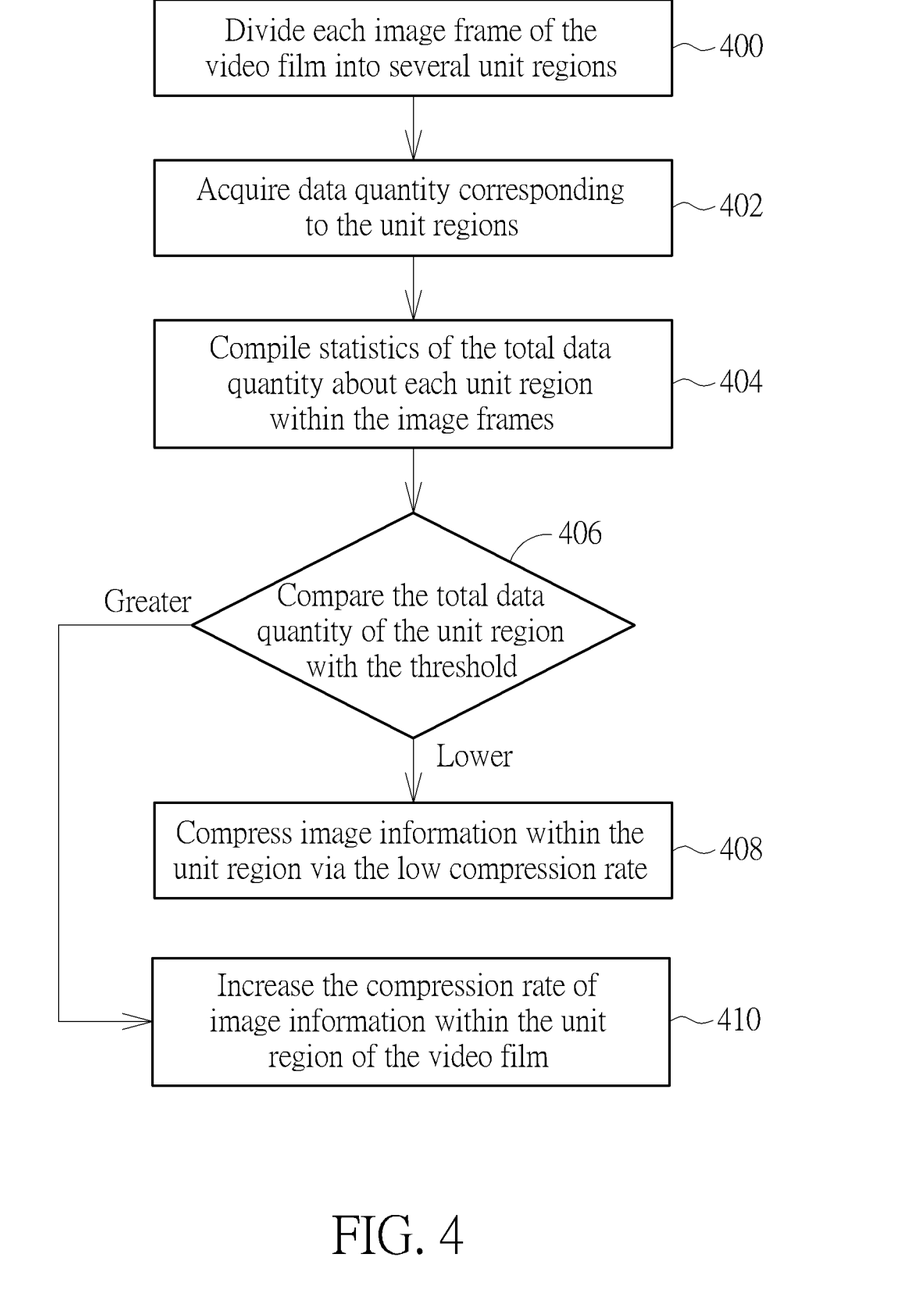
FIG. 4 is a flowchart of an image processing method according to the embodiment of the present invention.
Figure 5:
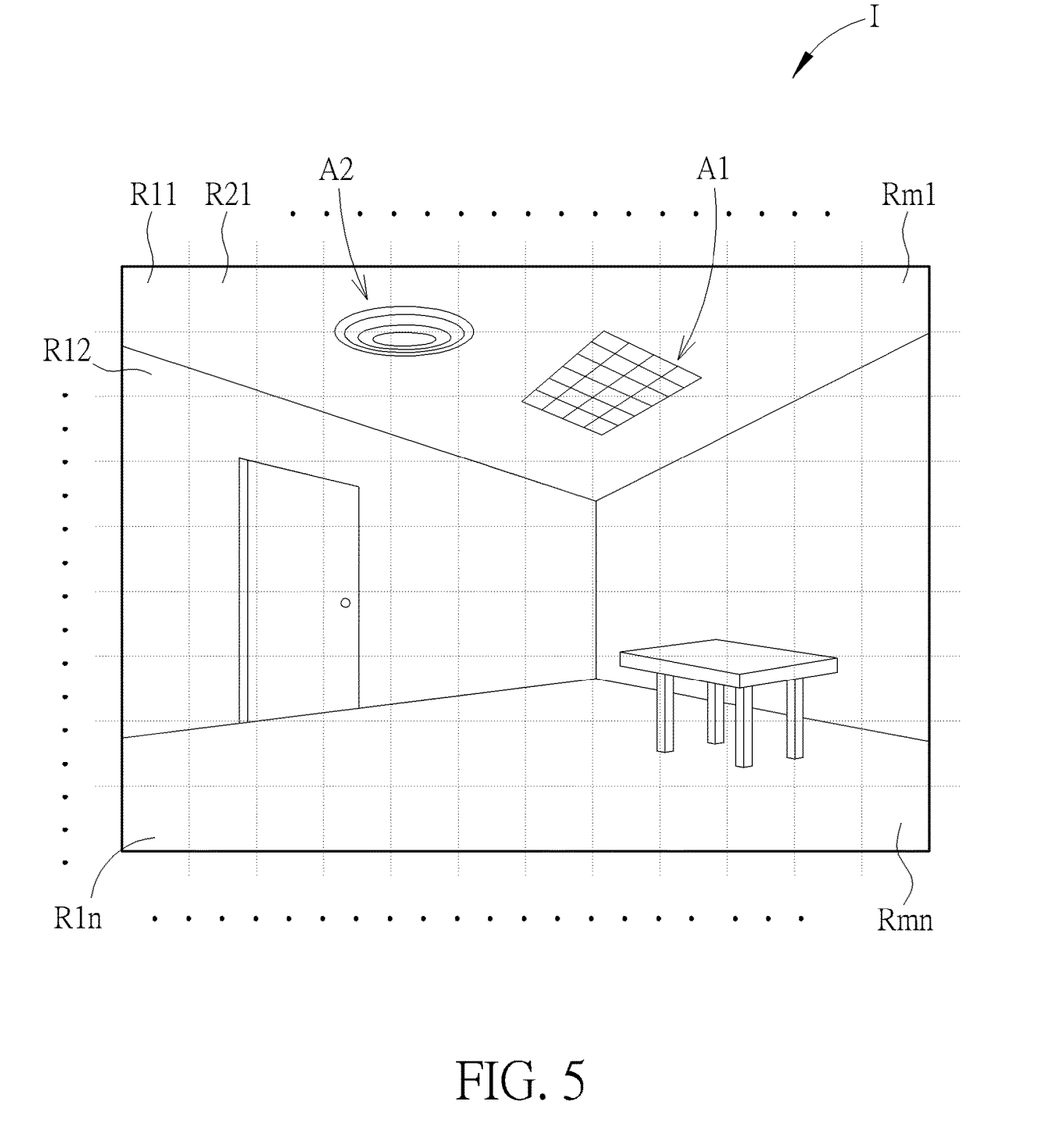
FIG. 5 is a diagram of the image frame according to the embodiment of the present invention.

Please refer to FIG. 4 and FIG. 5. FIG. 4 is a flow chart of the image processing method according to the embodiment of the present invention. FIG. 5 is a diagram of the image frame I according to the embodiment of the present invention. The image processing method illustrated in FIG. 4 can be suitable for the camera system 10 shown in FIG. 1 and the camera device 12 shown in FIG. 2. The camera system 10 and the camera device 12 are used to monitor any abnormal situation inside the monitoring region. Pixels within the image frame I are analyzed by image recognition technique to automatically determine whether a region with highly concentrated patterns or frequently varied patterns belongs to a region of interest (such as a human walking or a window opened). However, some background within the image frame I may conform to conditions of the highly concentrated patterns or the frequently varied patterns, such as the window A1 and the fan A2, so that the image processing method of the present invention can distinguish an object under test from background prepared to eliminate. The region (which means the region of interest) within the image frame I containing the object under test can be processed via the low compression rate for preferred resolution, clear image quality and large data quantity. The other region containing the background prepared to eliminate can be processed via the high compression rate for low resolution, blurred image quality and small data quantity. The present invention can provide high monitoring quality when compressing the image frame I. The region of interest can be kept in the great image quality and the region of not interest can be compressed into the low image quality.

First, step 400 is executed to divide each image frame I of the video film V into a plurality of unit regions R11, R21, R12, Rm1, R1n, . . . , Rmn, and an array size of each unit region is not limited. Steps 402 and 404 are executed to acquire a plurality of data quantity respectively corresponding to the plurality of unit regions R11~Rmn, and compile statistics of a total data quantity of each unit region within the plurality of image frames I. The data quantity of each unit region located at a specific location within the image frames I are added up to determine whether the pattern located at the specific location is complicated, frequently varied or eternally behaved. For example, an inextricable pattern or the frequently varied pattern may have the large data quantity, and a monotonous pattern or the unvaried pattern may have the small data quantity. The foresaid data quantity can be acquired with or without compression of the image information about the unit regions R11~Rmn, and the data quantity of each unit region can be original data or compressed data.

The total data quantity of each unit region can be aggregation of the plurality of data quantity of the foresaid unit region within the overall image frames I of the video film V. In case of the five-minute video film V shown at 30 fps, the total data quantity is the sum of nine-thousand data quantity, and the aggregation of the data quantity can be the sum, an average or any other computing value about the plurality of data quantity. In addition, the image processing method can utilize the image recognition technique to eliminate the unmatched image frame for decreasing the total data quantity less than the nine-thousand data quantity. Thus, the total data quantity of each unit region can be the aggregation of the data quantity within a part of the image frames I; or the total data quantity can be the sum, the average or the computing value of the plurality of data quantity without some data quantity which conforms to the specific standard.

Then, step 406 is executed to compare the total data quantity of any unit region with a threshold. When the total data quantity is lower than the threshold, the pattern within the unit region does not conform to the highly concentrated or frequently varied condition, and step 408 is executed to process the image information within the unit region via the low compression rate. When the total data quantity is higher than the threshold, the pattern highly concentrated or frequently varied exceeds a predetermined range, and step 410 is executed to increase the compression rate of the image information within the unit region of the video film V when the image recognition technique identifies that a part of or all of the foresaid unit region does not belong to the region of interest. Therefore, the image processing method of the present invention can identify the patterns about the window A1 and the fan A2 within the video film V, and the data quantity of the related unit region is highly compressed accordingly for economy of the bandwidth. The patterns about a table and a passerby are processed by the low compression rate to prevent the compressed image frame from distortion.

Figure 6:
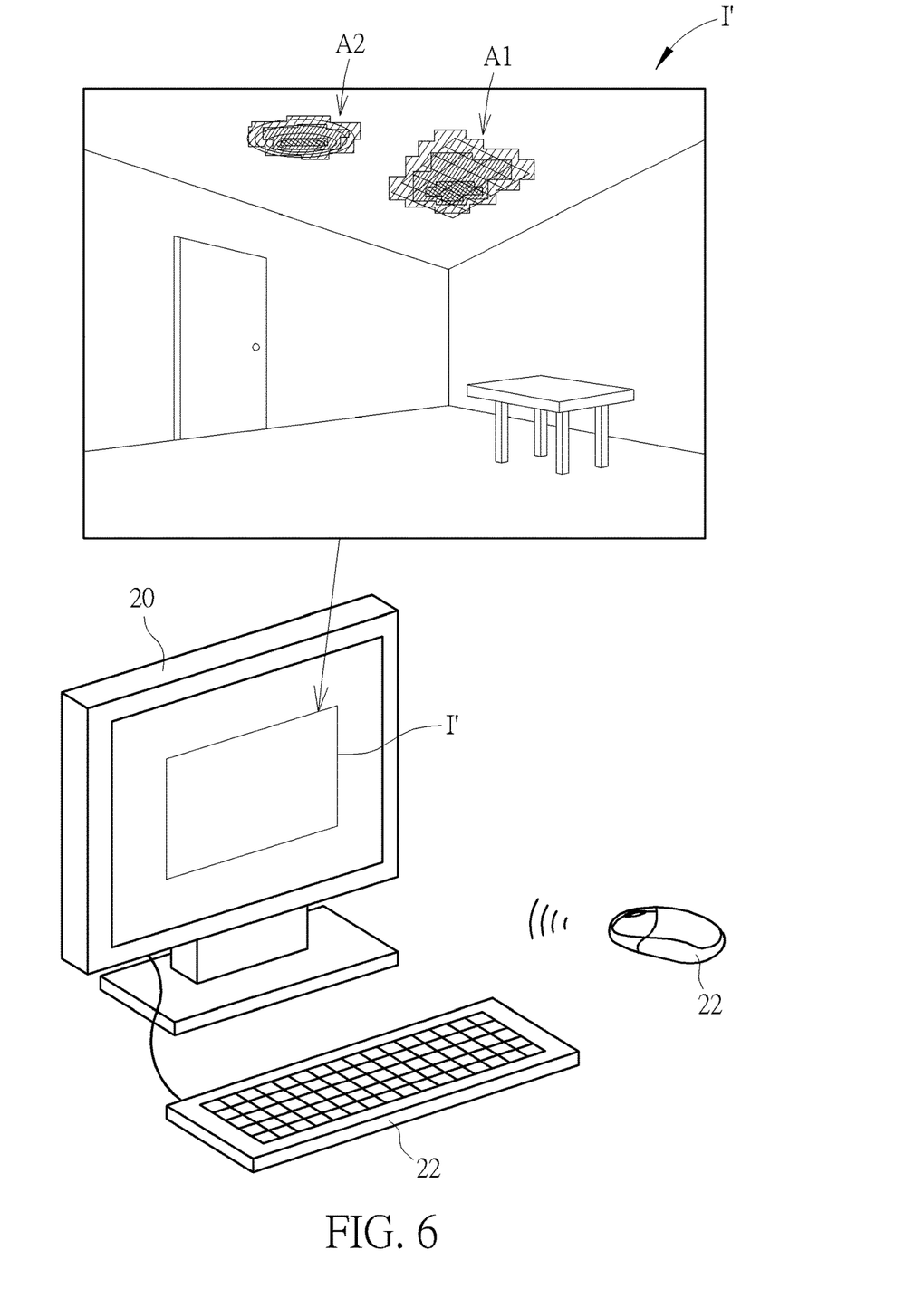
FIG. 6 is a diagram of the image frame according to another embodiment of the present invention.

The above-mentioned embodiment can find out the unit region which conforms to condition about the high compression rate, and the unit region accorded with the condition and the unit region not accorded with the condition are processed by different compression rates. Besides, the image processing method of the present invention further may provide a manual selecting function for deciding the unit region processed by the high compression rate. Please refer to FIG. 6. FIG. 6 is a diagram of the image frame I' according to another embodiment of the present invention. In this embodiment, when the statistics of the total data quantity about each unit region within the plurality of image frames I are compiled (such as step 404), the image processing method can show the unit region and any other unit regions on a displaying screen 20 in distinct manners due to difference of the total data quantity. The user can see the image frame I' through the displaying screen 20, so as to easily distinguish the unit region processed by the high compression rate from the unit region processed by the low compression rate within the image frame I'. The unit region processed by the low compression rate is meant to keep clear details about the region of interest.

Moreover, the image processing method of the present invention can utilize the total data quantity of each unit region to determine the said unit region belongs to a region processed by the high compression rate or the low compression rate. For example, the total data quantity of those unit regions can be ordered, and some of the unit regions with the largest total data quantity can be processed via the high compression rate and the other unit regions can be optionally processed via the low compression rate. Any method capable of allotting the specific compression rate to the corresponding unit region in accordance with a comparison of the total data quantity about those unit regions belongs to a scope of the present invention. The image processing method of the present invention further can divide the image frame into several regions respectively with different compression rates (such as the high compression rate, the middle compression rate and the low compression rate) in accordance with the user' demand.

The unit regions shown on the displaying screen 20 can be presented by different colors or the same color with different concentration. As shown in FIG. 6, the unit regions having different total data quantity are discriminated from each other by lines density, and an actual application is not limited to the above-mentioned embodiment. The total data quantity of the unit regions about the window A1 and the fan A2 is greater than others, and the user can draw a range for decreasing the data quantity on the displaying screen 20 by an operating interface 22, such as selecting the window A1 and the fan A2 together or selecting one of the window A1 and the fan A2. When the range for decreasing the data quantity is selected, the image processing method can adjust the compression rate of the unit regions within the selected range. The present invention can process the region of not interest inside the image frame I' via the high compression rate to decrease its data quantity, so that volume of the video film V can be reduced and the transmission bandwidth and the storage capacity can be economized accordingly.

It should be mentioned that the video film V can be captured during a specific time period, and the image processing method of the present invention can set a predefined period within the time period in an automatic manner or in a manual manner. When the compression rates of the unit regions are set according to the total data quantity, the unit regions of some image frames I or I' within the predefined period are picked out of the video film V for compressing the image information. The predefined period can be a specific range within the time period, or a specific circle within the time period. For example, the time period of the video film V captured by the camera device 12 can be twenty-four hours, and the specific range of the third hour, the fourth hour and the fifth hour can be defined as the predefined period, so that the image processing method of the present invention is applied to the image frame I or I' captured within the specific range. Further, the specific circle from 7:00 am to 9:00 am can be defined as the predefined period, and the image processing method of the present invention is applied to the image frame I or I' captured during rush hours. The present invention can vary the highly-concerned region due to the predefined period, and the user can acquire an image processing result in accordance with related circumstances at different space of time. For example, the highly-concerned region can be a region about the door at 8:00 am to 9:00 am, and the highly-concerned region can be switched to a region about the table at 9:00 am to 5:00 pm.

The image processing method of the present invention can divide each image frame into the plurality of unit regions automatically or manually via an operating interface, and the data quantity of the unit region located at the same place inside the plurality of image frames are added up. When the total data quantity of each unit region is greater than the threshold, the storage capacity and the transmission bandwidth are occupied by the large total data quantity, so that the said unit region can be processed via the high compression rate. When the total data quantity of the unit region is lower than the threshold, the storage capacity and the transmission bandwidth may leave unused due to small total data quantity, and the said unit region can be processed via the low compression rate.

That is, the present invention utilizes the bits of each unit region (or any parameters capable of indicating the data quantity) to determine regions applied by different compression rates within the image frame. The image processing method can automatically identify content of the image frame to decide the compression rates about different unit regions, so as to economize the storage capacity and the transmission bandwidth of the camera device or the camera system. Besides, the present invention can show the image frame (whereon some of the unit regions are marked according to the total data quantity) on the displaying screen, and an amount of the bits can be distinguished by lines with different widths or colors, therefore the user can select the region of not interest from some unit regions (the unit region is marked and has the total data quantity greater than the threshold) to process the image information via the high compression rate. The present invention can not only keep the region of interest in the high quality, but also provide preferred utilization about the storage capacity and the transmission bandwidth.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
   dividing each image frame of a video film in to a plurality of unit regions, wherein at least one pixel is encircled by each unit region;
   computing a plurality of data quantity of pixel values respectively in the plurality of unit regions of the each image frame, wherein the data quantity is a sum of the pixel values in each unit region;
   adding the data quantity of a unit region within one image frame to the data quantity of the unit region within other image frames for acquiring a total data quantity of the unit region;
   distinguishing the unit region from other unit regions in accordance with a comparison between a threshold and the total data quantity of the unit region and another comparison between the threshold and total data quantity of the other unit regions;
   determining a compression rate of each of the unit regions according to the foresaid comparison results;
   setting a predefined period within a time period of the video film; and
   compressing the unit regions of a part of the image frames within the video film during the predefined period via the compression rate;
   wherein the video film is captured during the time period, and the predefined period is a specific range within the time period or a specific circle within the time period.

2. The image processing method of claim 1, wherein computing the plurality of data quantity respectively corresponding to the plurality of unit regions comprises:
   compressing image information about the plurality of unit regions to acquire the plurality of data quantity.

3. The image processing method of claim 1, wherein distinguishing the each unit region from other unit regions in accordance with the total data quantity comprises:
   showing the each unit region and other unit regions on a displaying screen in distinct manners due to difference of the total data quantity.

4. The image processing method of claim 3, further comprising:
   adjusting a compression rate of the unit region within a region of interest when the region of interest is selected over the displaying screen via an operating interface.

5. The image processing method of claim 1, wherein when the total data quantity of the unit region is greater than the threshold, the compression rate of image information about the unit region within the video film is increased.

6. The image processing method of claim 1, wherein the total data quantity is a sum of the plurality of data quantity about all the image frames within the video film, or is a sum of the data quantity of a part of the image frames within the video film.

7. The image processing method of claim 6, wherein the sum of the data quantity is an average value or a total value of the plurality of data quantity, or an average value or a total value of the plurality of data quantity excluded at least one data quantity conforming to a specific standard.

8. A camera device, comprising:
   an image generator configured to capture a video film containing a plurality of image frames; and
   an operational processor electrically connected to the image generator and configured to analyze the video film, to divide each image frame of the video film in to a plurality of unit regions, to compute a plurality of data quantity of pixel values respectively in the plurality of unit regions of the each image frame, to add the data quantity of a unit region within one image frame to the data quantity of the unit region within other image frames for acquiring a total data quantity of the unit region, to distinguish the each unit region from other unit regions in accordance with a comparison between a threshold and the total data quantity of the unit region and another comparison between the threshold and total data quantity of the other unit regions, to determine a compression rate of each of the unit regions according to the foresaid comparison results, to set a predefined period within a time period of the video film, and to compress the unit regions of a part of the image frames within the video film during the predefined period via the compression rate;
   wherein at least one pixel is encircled by each unit region, the data quantity is a sum of the pixel values in each unit region, the video film is captured during the time period, and the predefined period is a specific range within the time period or a specific circle within the time period.

9. The camera device of claim 8, wherein the operational processor is further configured to show the each unit region and other unit regions on a displaying screen in distinct manners due to difference of the total data quantity.

10. The camera device of claim 8, wherein the total data quantity is a sum of the plurality of data quantity about all the image frames within the video film, or is a sum of the data quantity of a part of the image frames within the video film.

* * * * *